United States Patent [19]

Han

[11] Patent Number: 5,853,638
[45] Date of Patent: Dec. 29, 1998

[54] PROCESS FOR PRODUCING STRETCHED POROUS FILM

[75] Inventor: Young-Kyoo Han, Seoul, Rep. of Korea

[73] Assignee: Samsung General Chemicals Co., Ltd., Chungnam, Rep. of Korea

[21] Appl. No.: 884,656

[22] Filed: Jun. 27, 1997

[51] Int. Cl.⁶ .......................... B29C 55/14; B29C 55/16; B29C 67/20

[52] U.S. Cl. .................. 264/154; 264/210.6; 264/210.7; 264/235.8; 264/288.8; 264/290.2

[58] Field of Search .......................... 264/41, 154, 210.6, 264/210.7, 235.8, 288.8, 290.2

[56] References Cited

U.S. PATENT DOCUMENTS

| 3,725,520 | 4/1973 | Suzuki et al. .............................. 264/41 |
| 4,472,328 | 9/1984 | Sugimoto et al. . | |

FOREIGN PATENT DOCUMENTS

| 66672 | 12/1982 | European Pat. Off. . |
| 57-47334 | 3/1982 | Japan . |
| 60-185803 | 9/1985 | Japan . |
| 62-18435 | 1/1987 | Japan . |
| 62-27438 | 2/1987 | Japan . |
| 62-129321 | 6/1987 | Japan . |
| 62-235439 | 10/1987 | Japan . |
| 62-280233 | 12/1987 | Japan . |
| 62-280234 | 12/1987 | Japan . |
| 62-280235 | 12/1987 | Japan . |
| 62-288640 | 12/1987 | Japan . |
| 63-22844 | 1/1988 | Japan . |
| 58-149303 | 9/1988 | Japan . |
| 64-56744 | 3/1989 | Japan . |
| 1-196299 | 8/1989 | Japan . |
| 1-249840 | 10/1989 | Japan . |
| 5-5253 | 1/1993 | Japan . |

*Primary Examiner*—Leo B. Tentoni
*Attorney, Agent, or Firm*—Banner & Witcoff, Ltd.

[57] ABSTRACT

A process for producing a porous film, which includes melt-molding a composition prepared by compounding 100 parts by weight of a polyethylene resin mixture of low density polyethylene, linear low density polyethylene, and medium density polyethylene, 50–200 parts by weight of an inorganic filler coated with stearic acid, and 0.1–30 parts by weight of polyethylene wax into film, and stretching the resulting film by an area stretching ratio of 1.5–36 times. The process of the preferred embodiment coats the inorganic filler by floating the inorganic filler with air pressure and spraying the coating onto the floating filler.

6 Claims, No Drawings

PROCESS FOR PRODUCING STRETCHED POROUS FILM

FIELD OF THE INVENTION

The present invention relates generally to a process for producing a porous film, and specifically to a process for producing a biaxially stretched porous film which is soft to the touch and possesses excellent strength and biaxial stretchability, and also possesses adequate permeability.

BACKGROUND OF THE INVENTION

Porous film is used for the manufacture of disposable diapers, water-proof clothing, packing materials, medical supplies, and in many other applications as well. Especially when used for the manufacture of disposable diapers, soft porous film with adequate permeability is widely used to help prevent diaper rash.

Various processes for producing porous film (as disclosed by, for example, U.S. Pat. No. 4,472,328, or Japanese Laid Open Patents No. Sho 58-149303, Sho 59-G9906 and Sho 60-185803) teach the addition of inorganic fillers to polyolefin resin at various ratios. The mixtures are then melt-molded to obtain a sheet of the material and the sheet monoaxially or biaxially stretched to form minute pores in the interface between the resin and the inorganic fillers.

However, the cited processes produce films with inferior mechanical properties when compared with non-porous films. The minute pores weaken the film; reducing both tensile strength and tear resistance lateral ("transverse" or "perpendicular") to the stretched axis.

Disposable diapers are customarily stretched at the corners and then held in the stretched position by adhesive tape. The result is a biaxial stretch which pulls the diaper in both the stretched axis and in the weaker lateral axis. Often, diapers tear as a result of the lateral strain, resulting in inconvenience, discomfort, diaper rash, and increased cost as the torn diaper is replaced.

A biaxially stretched porous film, with its superior mechanical properties, solves this problem. However, manufacturing processes proposed to date have either not had satisfactory results or have been expensive, thus increasing the cost of the final product.

There are two common methods of biaxially stretching porous film during manufacture. In the first method, two-fold blown porous film is formed and almost simultaneously stretched biaxially. In the second method, two successive biaxial stretches are performed on the film: first the longitudinal stretch is performed by a roller, then a lateral stretch is performed by a tenter. Both of these methods present a problem in maintaining even film thickness, and both are prone to break the film during processing. The second method especially is liable to break the film, as the great number of fine pores produced by the first (roller) stretch become weak points causing breaks during the second (tenter) stretch.

To solve these problems, a number of additives have been proposed. These additives are added to the composition of polyethylene resin and inorganic filler to attempt to produce a mechanically superior product.

For example, European Patent Publication No. 66672 proposes liquid or waxy hydrocarbon polymers as a third ingredient; liquid or waxy hydrocarbon polymers are also proposed by U.S. Pat. No. 4,472,328 in the form of liquid polybutadiene or process aids containing liquid polybutadiene polymer; Japanese Laid Open Patent No. Sho 57-47334 proposes a similar polyhydroxy saturated hydrocarbon; No. Sho 61-144331 proposes polyester or epoxy group plasticizers; No. Sho 62-129321 teaches silicon oil; and No. Sho 62-235439, No. Sho 62-18435, No. Sho 62-27438, No. Sho 62-280233, No. Sho 62-280234, No. Sho 62-280235, No. Sho 62-288640, No. Sho 63-22844, No. Hei 1-56744, No. Hei 196299, No. Hei 1-249840, and No. Hei 5-5253, such esters as dipentaerythrytol and so on.

However, adoption of the many "third ingredients" given in the patents cited above has not proven to be a satisfactory solution to the problems of uneven thickness and breaking of the film. In addition, these proposed additives increase the cost of the final product due to their own high prices.

SUMMARY OF THE INVENTION

The present invention solves these problems and others by disclosing a process for the manufacture of a biaxially stretched porous film which is safe from the problems of uneven thickness and breaking during manufacture. The present invention discloses compounding of a polyethylene resin mixture of three different kinds of polyethylene resin in a certain ratio, a quantity of inorganic filler coated with stearic acid and a quantity of a polyethylene wax together. The resulting compound is melt-molded into a film and the resulting film is stretched biaxially. The product which results is superior in strength and tear resistance to the products resulting from the processes cited above.

It is therefore one object of the present invention to provide a process for producing a porous film which is soft to the touch, adequately permeable and yet strong and tear resistant in use.

It is a further object of the present invention to provide a process for producing a biaxially stretched porous film which is of even thickness.

It is yet a further object of the present invention to provide a process for producing a biaxially stretched porous film which is resistant to breaking during the course of being stretched by roller and tenter.

It is yet a further object of the present invention to provide an improved process for coating of the inorganic filler material. It will be readily apparent to one skilled in the art that the present invention solves many other problems as well.

DETAILED DESCRIPTION OF THE INVENTION

The present invention is a process for the manufacture of a biaxially stretched porous film. The process of the present invention compounds a polyethylene resin mixture of three different kinds of polyethylene resin in a certain ratio, with a quantity of inorganic filler coated with stearic acid and a quantity of a polyethylene wax together. The resulting compound is melt-molded into a film and the resulting film is stretched biaxially.

In detail, the composition used in the present invention comprises 100 parts by weight of a mixture of three low and medium density polyethylene resins. The three different kinds of polyethylene resin used are low density polyethylene resin having a density of 0.916–0.922 grams per cubic centimeter, linear low density polyethylene resin having a density of 0.923–0.930 grams per cubic centimeter, and medium density polyethylene having a density of 0.931–0.940 grams per cubic centimeter. The composition also contains 50–200 parts by weight of an inorganic filler coated with stearic acid and 0.1–30 parts by weight of polyethylene wax.

The polyethylene resins which can be used in the present invention may be monopolymers or copolymers, and the copolymers can include propylene, butene, hexene, or octene. Polyethylenes having melt indices (MI) of 0.02–20 grams per 10 minutes (as measured at 190° C., 2.16 Kg by ASTM D 1238-70) are used in the invention. When MI is below 0.02 grams/10 minutes the film becomes uneven during extrusion and melt-molding, while when MI is over 20 grams/10 minutes, the stretchability is poor.

In the preferred embodiment, the three types of polyethylene resin are mixed in approximately equal parts by weight, i.e. 33 parts by weight of low density polyethylene resin (0.916–0.922 g/cc), 33 parts by weight of linear low density polyethylene resin (0.923–0.930 g/cc), and 34 parts by weight of medium density polyethylene resin (0.931–0.940 g/cc).

When low density polyethylene is used alone, the film produced has low strength and often breaks during biaxial stretching. If the linear low density polyethylene is used alone, the thickness of the porous film is uneven and the permeability low. If the medium density polyethylene is used alone, the strength and permeability of the film improve, but the thickness of the film becomes uneven and still the film often breaks during biaxial stretching.

There are also three ways to combine the three resins which use only two of the resins. However, if only linear low density polyethylene and medium density polyethylene are used in the compounding, strength improves, but the thickness of the film becomes uneven, and the "neck-in" phenomenon occurs at the time of processing of the film, lowering the productivity of the film. If only the low density polyethylene resin and linear low density polyethylene resin are used in the compounding step, then the processibility of the film improves but the strength and permeability worsen. Finally, if only the low density polyethylene and medium density polyethylene are used in the compounding then processability and strength improve but breaking still occurs during biaxial stretching.

The inorganic filler used in the working of the present invention may be any of a wide range of materials. Examples of such materials include: calcium carbonate, silica, barium sulfate, magnesium sulfate, calcium sulfate, talc, kaolin, aluminum hydroxide, magnesium hydroxide, zinc oxide, alumina, titanium oxide, mica, zeolite, silica clay, magnesium carbonate, clay, and etc. The filler may also be some mixture of the materials listed above. The form of the inorganic filler can be globular, plate or acicular. The mean particle size of the inorganic filler can range from 0.1 to 5 $\mu$m. When the mean particle size is less than 0.1 $\mu$m, it becomes difficult for the inorganic filler to disperse within the resin and the physical properties worsen. If the particle size is more than 5 $\mu$m, the surface of the formed porous film has an unpleasant appearance.

In the preferred embodiment, the inorganic filler is of a globular shape and ranges in size from 0.5 to 3 $\mu$m.

When the amount of inorganic filler used is less than 50 parts by weight, the interface between the polyethylene resin and the inorganic filler can exfoliate, and porosity and permeability remain poor. When the amount used is greater than 200 parts by weight, such physical properties as stretchability become poor.

In the preferred embodiment, 50 to 200 parts by weight of the inorganic filler are used.

When an inorganic filler coated with stearic acid is used in the process, it undergoes a synergism with the polyethylene wax, it disperses better within the resin, and the breaking of film during biaxial stretching is remarkably reduced.

In the present invention, it is possible to use an inorganic filler coated with stearic acid by the conventional method of passing the filler and the stearic acid through a heated drum.

In the preferred embodiment, the inorganic filler is coated with stearic acid using a technique developed by the inventors. The particles of inorganic filler are floated in the air with high pressure. Stearic acid is then sprayed onto the floating particles to coat the particles with the stearic acid.

This method of coating is more efficient than the conventional method. By the conventional method, 90–95% of a calcium carbonate inorganic filler can be coated with stearic acid of about 2.0% by weight. Using the method of the preferred embodiment, about 95% calcium carbonate inorganic filler can be coated with stearic acid of about 0.8% by weight.

The conventional method of coating also leaves stearic acid coated rather loosely upon the inorganic filler, causing such undesirable side effects as the accumulation of foreign substances near the outlet of the extruder die ("die-buildup") or reduction of pressure of the molten resin during processing and so on. The improved coating method remarkably decreases these undesirable side effects.

The polyethylene wax used in the present invention serves to improve the softness of the resulting film. The polyethylene wax also serves to improve the dispersability of the inorganic fillers due to its strong adhesion to the inorganic filler.

When conventional low molecular weight polymer additives are used in the making of porous films, various problems result: contamination of the stretching rolls due to elusion of the additives, uneven thickness of film due to irregular flow during extrusion and so on. Since the polyethylene wax used in the present invention is a high molecular weight polymer, these problems are avoided.

If the polyethylene wax has a weight average molecular weight of less than about 200, the dispersability of the inorganic filler in the resin is excellent, and the tactile quality of the film produced is good, but the strength of the film suffers, contamination increases and the thickness of the film becomes uneven. If the polyethylene wax has a weight average molecular weight of greater than about 5,000, the dispersability of the inorganic filler in the resin and the tactile quality of the produced film both suffer. Finally, if the ratio of weight average molecular weight to number average molecular weight is greater than 5.0, excess gas arises during processing due to pyrolysis.

In the preferred embodiment, the polyethylene wax used has a weight average molecular weight of 200–5,000 and the ratio of weight average molecular weight to number average molecular weight of 1.0–5.0.

The proportion of polyethylene wax used is 0.1 to 30 parts by weight. If the proportion is below 0.1 part by weight, the tactile sensation of the film deteriorates remarkably, while if the proportion is above 30 parts by weight, the excess wax impairs the permeability of the film.

In the preferred embodiment, the proportion of the polyethylene wax used is 0.5–25 parts by weight.

In the present invention, the compounding is conducted by placing the polyethylene resins, the inorganic filler coated with stearic acid, and the polyethylene wax in a conventional blender or mixer such as a drum tumbler mixer, a ribbon blender, a Henschel mixer, super mixer or equivalent. The resultant mixture is then kneaded using conventional apparatus such as a single screw extruder, twin screw extruder, mixing roll, Bumbury's mixer, biaxial kneader or equivalent. The compounding is completed with pelletization of the product.

In the preferred embodiment, a high speed agitation type mixer such as a Henschel mixer is used.

The molding step of the present invention is conducted using conventional molding apparatus and methods such as use of a circular die for inflation molding, use of a T-die for extrusion molding and so on. Many other equivalents may be properly employed in practicing the invention.

The product thus formed by molding is monoaxially stretched at a temperature between its glass transition point and its melting point at a ratio of 1.2–6.0 times original length in the machine direction (MD) (the stretched direction). Then the product is stretched again, but in the lateral (transverse) direction (TD) so as to obtain a biaxially stretched porous film. The second stretch also occurs at a temperature between the glass transition point of the material and the melting point of the material. The ratio of the second stretch is also 1.2–6.0 times original width in the lateral direction, resulting in an area stretching ratio of the biaxial stretch of 1.5–36 times the original film size.

In the preferred embodiment, the monoaxial stretch ratios are from 1.5 to 5.0 times, resulting in an area stretch ratio of approximately 2.25 to 25 times original film size.

Note that if the temperature is below the glass transition point, it is impossible to perform the desired stretching without breaking the film, whereas if the temperature is above the melting point, it is impossible to obtain sufficient permeability. When the area stretch ratio is below 1.5 times the original size, permeability is impaired. If the area stretch ratio is above 6.0 times the original film size, then the film often breaks during stretching.

Below, the present invention will be described in more detail by reference to the example embodiments below. The examples below, however, only serve the purpose of illustration and do not confine or limit the present invention.

EXAMPLES

The following standards and methods were used to measure the various characteristics of the present invention and comparative examples.

Tensile Strength

The tensile strength (in kilograms/centimeter squared) of the samples were measured at the point of break by JIS P 8113 in both the machine direction (MD) and the lateral or transverse direction (TD). The sample used was 100 mm in length, 25 mm in width, the temperature was 23° C. and the elongation rate was 500 mm/minute.

Tear Resistance

The tear resistance (in grams) of a sample of the final product was measured by JIS K 6772, at a temperature of 23° C. and an elongation rate of 300 mm/minute.

Water Vapor Permeability

The water vapor permeability (grams/meter squared in 24 hours) of a sample was measured by ASTM E 96–63 at a temperature of 37.8° C. and a relative humidity of 90%.

Pliability

The tactile softness of the samples was rated using a subjective score taken from touching the material by hand. ⊚: very soft, ◯: soft, Δ: slightly hard, X: hard and unpleasant to the touch.

Dispersability

Dispersability of the inorganic filler and various other additives in samples were observed and reported. ⊚: very good dispersion, ◯: good dispersion, Δ: ordinary dispersion, X: bad dispersion.

Processibility, Neck-in

The ratio of shrinking in width of the film ("neck-in ratio") was measured as the film was extruded from a T-die of 2000 mm width. The measurement was made at the cooling roll during the stretching process. The speed of extrusion was 25 m/minute. The lower the ratio, the better the productivity.

(As an example, if the film is extruded at a width of 2000 mm and shrinks by a width of 300 mm at the cooling roll, then the shrinking ratio is 300/2000=15% shrinkage.)

Processibility, Evenness

The regularity of the thickness of the produced film was measured over time as the film was being stretched following extrusion by a T-die of 2000 mm width. ⊚: very good, ◯: good, Δ: ordinary, X: bad.

Processibility, Breakage resistance during biaxial stretch

The breakage of the film was observed while being stretched in the lateral direction by the tenter following extrusion from a T-die of 2000 mm width and stretch in the longitudinal direction by rollers. The highest rating (⊚) was received for breaking 0–3 times during 24 hours of processing, the second highest rating (◯)for breaking 4–7 times during 24 hours of processing, the ordinary rating (Δ) was received for breaking 8–12 times during 24 hours of processing and the bad rating (X) for breaking 13 times or more during 24 hours of processing.

Examples 1–10

The examples used 100 parts by weight of a polyethylene resin mixture of 33 parts by weight resin A, 33 parts by weight resin B, 34 parts by weight resin C, calcium carbonate coated with stearic acid and polyethylene wax in the proportions given in Table I-1 below.

Resin A: ethylene-hexene copolymer, hexene content 18% by weight, density 0.918 g/cc, melting index 5.0 g/10 minutes at 190° C. and 2.16 kg, catalog: Hanyang Chemical's LDPE 960.

Resin B: ethylene-hexene copolymer, hexene content 13% by weight, density 0.924 g/cc, melting index 2.5 g/10 minutes at 190° C. and 2.16 kg, catalog: Samsung General Chemical's LL6040.

Resin C: ethylene-hexene copolymer, hexene content 8% by weight, density 0.935 g/cc, melting index 0.9 g/10 minutes at 190° C. and 2.16 kg, catalog: US Dow Chemical's MDPE 2037.

Calcium Carbonate: mean particle size 2.0 μm, coated with stearic acid.

Polyethylene Wax: number average molecular weight 2,500, weight average molecular weight 5,000.

The materials were mixed in a Henschel mixer, kneaded in a biaxial kneader and made into pellets. The pellets were put into a film-molding extruder and melt-extruded at 220° C. through a T-die. The round sheet plate obtained were then stretched at 60° C. in the machine direction (MD) at the stretching ratios given in Table I-1; stretched again by the tenter kept at 120° C. in the lateral or transverse direction (TD) at the stretching ratio given in Table I-1; and heat treated for one day at 110° C. The product was a polyethylene porous film of 38 μm thickness. Tests were made on the film as described above, the results are given in Table I-2 below.

Comparative Examples 1–6:

These examples were tested in the same way as example 5. Only the actual composition of the polyethylene resin was changed, as shown in Table II-1, with results in Table II-2. These tests show the results obtained when only one or two of the three resins are used in the process.

Comparative Example 7:

This test was performed in the same way as example 5, however, uncoated calcium carbonate was used instead of the stearic acid coated calcium carbonate of example 5. Results are shown in Table II-2.

Comparative Example 8:

This test was performed in the same way as example 5, except that polyethylene wax was not added to the compound. Results are shown in Table II-2.

Comparative Example 9:

This test was performed in the same way as example 5, except using liquid polybutadiene instead of polyethylene wax. The results are shown in Table II-2.

One skilled in the art will realize that the physical properties of the porous film produced by the present invention can be adapted by choice of the kinds and physical properties of the polyethylene resins, the type and granular structure of the inorganic filler, the type of polyethylene wax, the compounding ratios used, the stretching ratios, temperatures and methods and so on. In the process described above, it is possible to add such ordinary additives as lubricants, antioxidants, anti-static agents, processing aids and so on without departing from the scope of the present invention. The above detailed disclosure of the invention enables the use of the best known mode of the invention, however it will be readily apparent to one skilled in the art that the invention as disclosed above is susceptible to many equivalents, alterations and substitutions without departing from the spirit and scope of the present invention. The above disclosure sets out the best known mode of the invention and does not in any way limit the scope of what is claimed.

TABLE I-1

| | Polyethylene Resin | | | Inorganic Filler | | The Third Ingredient | | |
| --- | --- | --- | --- | --- | --- | --- | --- | --- |
| Exmp. | Kind | Proportion (wt %) | Amount (parts by weight) | Kind | Amount (parts by weight) | Kind | Amount (parts by weight) | Stretching Ratio (MD × TD) |
| Exmp. 1 | A + B + C | 33 + 33 + 34 | 100 | coated calcium carbonate | 67 | polyethylene wax | 0.8 | 1.7 × 1.5 |
| Exmp. 2 | A + B + C | 33 + 33 + 34 | 100 | coated calcium carbonate | 67 | polyethylene wax | 1.6 | 1.7 × 1.5 |
| Exmp. 3 | A + B + C | 33 + 33 + 34 | 100 | coated calcium carbonate | 67 | polyethylene wax | 3.2 | 1.7 × 1.5 |
| Exmp. 4 | A + B + C | 33 + 33 + 34 | 100 | coated calcium carbonate | 67 | polyethylene wax | 8.0 | 1.7 × 1.5 |
| Exmp. 5 | A + B + C | 33 + 33 + 34 | 100 | coated calcium carbonate | 67 | polyethylene wax | 16.0 | 1.7 × 1.5 |
| Exmp. 6 | A + B + C | 33 + 33 + 34 | 100 | coated calcium carbonate | 67 | polyethylene wax | 16.0 | 1.9 × 1.7 |
| Exmp. 7 | A + B + C | 33 + 33 + 34 | 100 | coated calcium carbonate | 67 | polyethylene wax | 16.0 | 2.1 × 1.9 |
| Exmp. 8 | A + B + C | 33 + 33 + 34 | 100 | coated calcium carbonate | 67 | polyethylene wax | 16.0 | 2.6 × 1.0 |
| Exmp. 9 | A + B + C | 33 + 33 + 34 | 100 | coated calcium carbonate | 100 | polyethylene wax | 20.0 | 2.6 × 1.0 |
| Exmp. 10 | A + B + C | 33 + 33 + 34 | 100 | coated calcium carbonate | 150 | polyethylene wax | 25.0 | 2.6 × 1.0 |

TABLE I-2

| | Physical Properties of Film | | | | | | | |
| --- | --- | --- | --- | --- | --- | --- | --- | --- |
| Exmp. | Tensile Strength (MD/TD) kg/cm$^2$ | Tear Resistance (MD) g | Water Vapor Permeability g/m$^2$ · 24 hr | Pliability | Dispersibility | Neck-in % | Thickness Regularity | Breakage Resistance |
| Exmp. 1 | 130/100 | 55 | 4,000 | ○ | ⊙ | 9 | ⊙ | ⊙ |
| Exmp. 2 | 125/95 | 65 | 3,800 | ⊙ | ⊙ | 9 | ⊙ | ⊙ |
| Exmp. 3 | 120/90 | 69 | 3,200 | ⊙ | ⊙ | 9 | ⊙ | ⊙ |
| Exmp. 4 | 110/80 | 72 | 3,000 | ⊙ | ⊙ | 9 | ⊙ | ⊙ |
| Exmp. 5 | 95/80 | 80 | 2,800 | ⊙ | ⊙ | 9 | ⊙ | ⊙ |
| Exmp. 6 | 110/95 | 74 | 3,700 | ⊙ | ⊙ | 9 | ⊙ | ⊙ |
| Exmp. 7 | 125/105 | 77 | 4,300 | ○ | ⊙ | 9 | ⊙ | ⊙ |
| Exmp. 8 | 135/75 | 51 | 3,500 | ⊙ | ⊙ | 9 | ⊙ | ⊙ |

TABLE I-2-continued

Physical Properties of Film

| Exmp. | Tensile Strength (MD/TD) kg/cm$^2$ | Tear Resistance (MD) g | Water Vapor Permeability g/m$^2$ · 24 hr | Pliability | Dispersibility | Neck-in % | Thickness Regularity | Breakage Resistance |
|---|---|---|---|---|---|---|---|---|
| Exmp. 9 | 130/70 | 48 | 4,200 | ⊙ | ⊙ | 9 | ⊙ | ⊙ |
| Exmp. 10 | 120/65 | 45 | 4,500 | ○ | ⊙ | 9 | ⊙ | ⊙ |

TABLE II-1

| | Composition | | | | | | |
|---|---|---|---|---|---|---|---|
| | Polyethylene Resin | | Inorganic Filler | | The Third Ingredient | | |
| Comp. Exmp. | Kind | Proportion (wt %) | Amount (parts by weight) | Kind | Amount (parts by weight) | Kind | Amount (parts by weight) | Stretching Ratio (MD × TD) |
| Comp. Exmp. 1 | A | 100 | 100 | coated calcium carbonate | 67 | polyethylene wax | 16 | 1.7 × 1.5 |
| Comp. Exmp. 2 | B | 100 | 100 | coated calcium carbonate | 67 | polyethylene wax | 16 | 1.7 × 1.5 |
| Comp. Exmp. 3 | C | 100 | 100 | coated calcium carbonate | 67 | polyethylene wax | 16 | 1.7 × 1.5 |
| Comp. Exmp. 4 | A + B | 50 + 50 | 100 | coated calcium carbonate | 67 | polyethylene wax | 16 | 1.7 × 1.5 |
| Comp. Exmp. 5 | A + C | 50 + 50 | 100 | coated calcium carbonate | 67 | polyethylene wax | 16 | 1.7 × 1.5 |
| Comp. Exmp. 6 | B + C | 50 + 50 | 100 | coated calcium carbonate | 67 | polyethylene wax | 16 | 1.7 × 1.5 |
| Comp. Exmp. 7 | A + B + C | 33 + 33 + 34 | 100 | uncoated calcium carbonate | 67 | polyethylene wax | 16 | 1.7 × 1.5 |
| Comp. Exmp. 8 | A + B + C | 33 + 33 + 34 | 100 | coated calcium carbonate | 67 | — | — | 1.7 × 1.5 |
| Comp. Exmp. 9 | A + B + C | 33 + 33 + 34 | 100 | coated calcium carbonate | 67 | liquid polybutadiene | 16 | 1.7 × 1.5 |

TABLE II-2

Physical Properties of Film

| Comp. Exmp. | Tensile Strength (MD/TD) kg/cm$^2$ | Tear Resistance (MD) g | Water Vapor Permeability g/m$^2$ · 24 hr | Pliability | Dispersibility | Neck-in % | Thickness Regularity | Breakage Resistance |
|---|---|---|---|---|---|---|---|---|
| Comp. Exmp. 1 | 80/65 | 19 | 1,800 | ⊙ | ○ | 7 | ○ | x |
| Comp. Exmp. 2 | 110/85 | 28 | 1,500 | ○ | ○ | 22 | ○ | x |
| Comp. Exmp. 3 | 120/100 | 33 | 2,300 | x | ○ | 22 | Δ | x |
| Comp. Exmp. 4 | 95/75 | 25 | 1,800 | ○ | ○ | 9 | ○ | x |
| Comp. Exmp. 5 | 105/85 | 28 | 2,200 | Δ | ○ | 9 | Δ | x |
| Comp. Exmp. 6 | 115/98 | 33 | 2,200 | x | ○ | 22 | Δ | x |
| Comp. Exmp. 7 | 110/95 | 28 | 3,500 | x | x | 9 | ○ | x |
| Comp. Exmp. 8 | 110/95 | 33 | 2,500 | ○ | ○ | 9 | ○ | x |
| Comp. Exmp. 9 | 108/98 | 40 | 3,600 | ○ | ○ | 11 | ○ | x |

What is claimed is:

1. A process for producing a porous film, which comprises the steps of:

compounding 50 to 200 parts by weight of an inorganic filler coated with stearic acid, 0.1 to 30 parts by weight of polyethylene wax, and 100 parts by weight of a polyethylene resin mixture of low density polyethylene having a density of 0.916 to 0.922 grams/cubic centimeter, linear low density polyethylene having a density of 0.923 to 0.930 grams/cubic centimeter, and medium density polyethylene having a density of 0.931 to 0.940 grams/cubic centimeter to produce a compound, melt-molding said compound to produce a film, and stretching said film at an area stretching ratio of 1.5 to 36 times.

2. A process according to claim 1, wherein each of said polyethylene resins is selected from the group consisting of:

ethylene monopolymer having 0.02 to 20 grams/10 minutes of melt index (as measured by ASTM D 1238-70 at 190° C., 2.16 kg) and ethylene copolymer having 0.02 to 20 grams/10 minutes of melt index (as measured by ASTM D 1238-70 at 190° C., 2.16 kg).

3. A process according to claim 1, wherein said inorganic filler is selected from the group consisting of:

calcium carbonate, silica, barium sulfate, magnesium sulfate, calcium sulfate, kaolin, aluminum hydroxide, magnesium hydroxide, zinc oxide, alumina, titanium oxide, mica, zeolite, silica clay, magnesium carbonate, clay, and a mixture thereof.

4. A process according to claim 1, wherein the weight average molecular weight of said polyethylene wax is 200 to 5000, and further wherein the ratio of weight average molecular weight to number average molecular weight of said polyethylene wax is 1.0 to 5.0.

5. A process according to claim 1, wherein said 100 parts by weight of polyethylene resin mixture is mixed in a ratio of 33 parts by weight of said low density polyethylene having a density of 0.916 to 0.922 grams/cubic centimeter, 33 parts by weight of said linear low density polyethylene having a density of 0.923 to 0.930 grams/cubic centimeter, and 34 parts by weight of said medium density polyethylene having a density of 0.931 to 0.940 grams/cubic centimeter.

6. A process for producing a porous film, which comprises the steps of:

floating inorganic filler in the air under high pressure, spraying molten stearic acid upon said floating inorganic filler, compounding 50 to 200 parts by weight of said inorganic filler coated with stearic acid, 0.1 to 30 parts by weight of polyethylene wax, and 100 parts by weight of a polyethylene resin mixture of low density polyethylene having a density of 0.916 to 0.922 grams/cubic centimeter, linear low density polyethylene having a density of 0.923 to 0.930 grams/cubic centimeter, and medium density polyethylene having a density of 0.931 to 0.940 grams/cubic centimeter to produce a compound, melt-molding said compound to produce a film, and stretching said film at an area stretching ratio of 1.5 to 36 times to form said porous film.

* * * * *